Nov. 24, 1936.  W. T. WELLS  2,061,863
WEIGHT AND TENSION MEASURING DEVICE
Filed Oct. 21, 1933   2 Sheets-Sheet 1

Walter T. Wells
INVENTOR

Nov. 24, 1936.  W. T. WELLS  2,061,863
WEIGHT AND TENSION MEASURING DEVICE
Filed Oct. 21, 1933    2 Sheets-Sheet 2

Walter T. Wells
INVENTOR

Patented Nov. 24, 1936

2,061,863

UNITED STATES PATENT OFFICE 2,061,863

WEIGHT AND TENSION MEASURING DEVICE

Walter T. Wells, Glendale, Calif., assignor to The Technicraft Engineering Corporation, Los Angeles, Calif., a corporation of California Application October 21, 1933, Serial No. 694,564

12 Claims. (Cl. 177—351)

This invention relates to the means and method of measuring the tension in a wire-line or the amount of weight suspended from it. It has proved to be of great utility in and around oil wells, where great quantities of cable or stranded-wire line are used, and is extremely simple and at the same time most accurate in results.

Many devices have been conceived for measuring the tension in a line, but all are more or less complicated and not adapted for conditions in the petroleum industry on drilling rigs, where it is necessary to keep both ends of the line free for wrapping on a hoisting drum, so devices that clamp on the outside of the cable must be removed before the cable is operative. Such removal consumes some time which is often of great value, and when such devices are replaced on the cable, the calibration is changed. Many devices have been conceived to be placed in the hook or swivel, but these of necessity require a flexible connection to enable the hook to be raised and lowered in the derrick, and still keep the device operative. Furthermore when weight-indicating devices are considered for operation on the hook or swivel, they must be strong enough to withstand the total pull, which may be up to 250 tons. A mobile device for these conditions on the hook, sensitive enough to read the weight from any small amount up to the capacity of the usual derrick equipment, must of necessity be very rugged and heavy. The limitations for a sensitive device for this purpose are very great.

In my invention I use space that is entirely wasted, do not interfere with any of the well equipment, and the device can be used in any place where a wire line can be used. The object of my invention is therefore to provide a simple weight-measuring device for a line, to determine the amount of weight suspended from the line or the amount of tension in the line, that is accurate and inexpensive and not affected by outside conditions.

In the accompanying drawings, Figure 1 shows in elevation the general arrangement of an oil well cable, but partly in section at the hoists.

In effect a stranded wire line is a series of coil springs meshed together, the number of springs being the same as the number of strands, and the pitch of coils equalling the lay of the cable. Stranded wire rope is fabricated around a hemp core, which core is of no particular value after the line is made. The hemp core does serve a useful purpose during manufacture and is used to prevent the strands from being compressed unevenly. I elect to leave out a part of this core and use other materials in its place that will answer the same purpose as far as manufacture, and yet serve a useful purpose during the life of the line. Further features of this invention will appear as the description progresses.

Figures 1, 2:
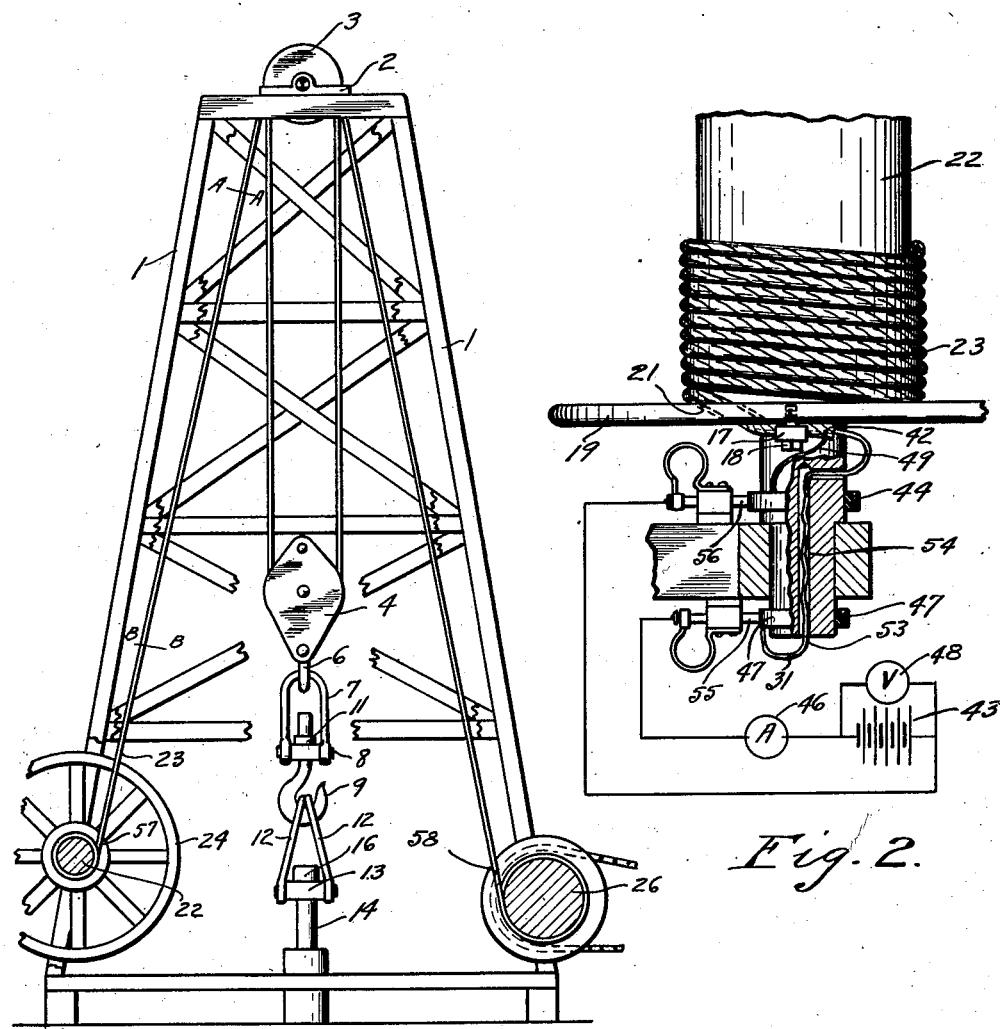
Figure 2 shows the part of my device that is attached to the shaft of the emergency hoist to which one end of the wire line is attached.
Figures 3, 4:
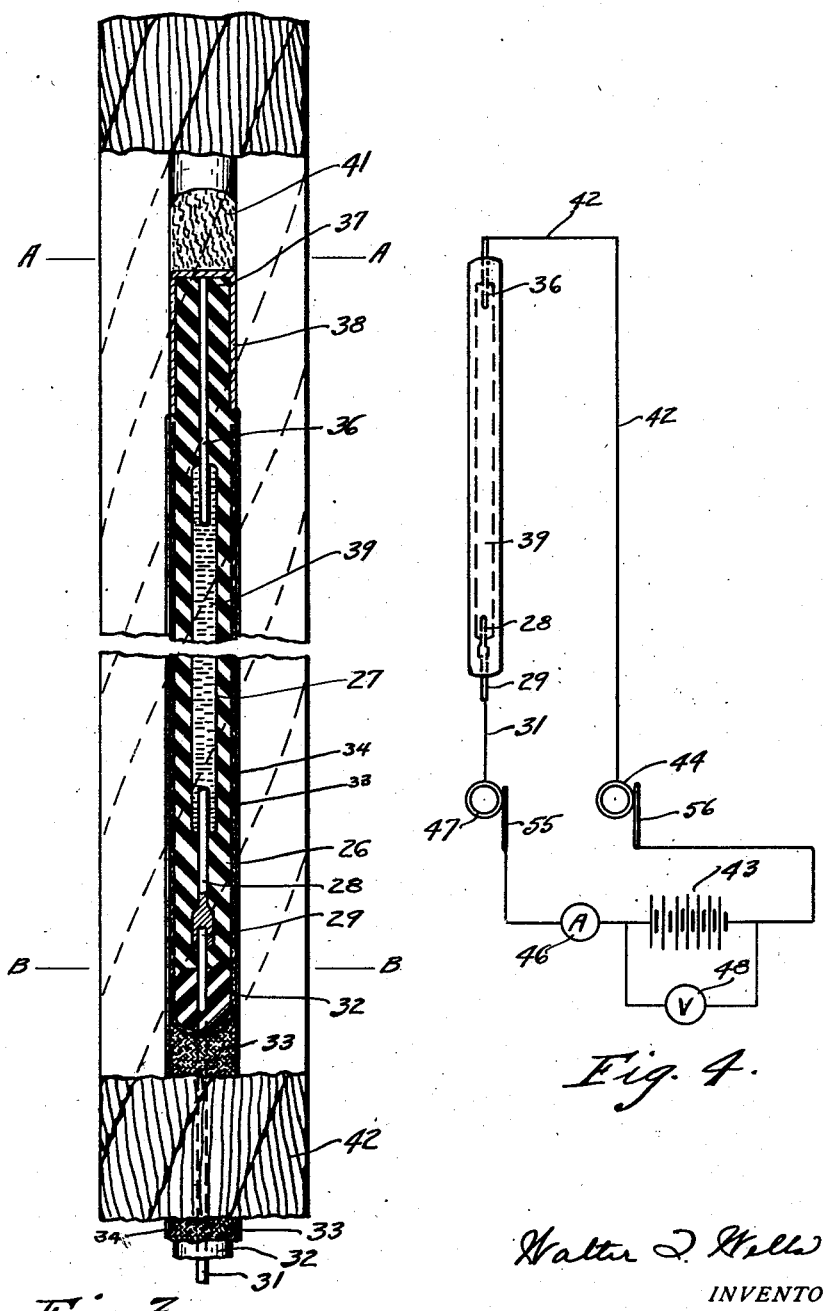
Figure 3 shows partly in section the activating part of my device which would normally come between A and B in Figure 1.
Figure 4 is an electrical diagram showing the connections.

Referring to Figure 1, the usual derrick is shown at 1, upon which is mounted a crown block 2, with sheaves 3 and from which is hung travelling block 4, clevis 6, clevis 7, pin 8, through which is passed hook 9, held in place by collar 11. From the hook 9 all manner of devices are hung, but I show links 12 attached to elevator 13, clamped around pipe 14 under the collar 16. One end of the wire line 23 is placed around the drum 22 of calf-wheel 24, through the flange 19 in hole 21 and clamped on by clamp 17 and cap screws 18. Some four or five hundred feet of line is then wrapped on the drum, the other end then carried up over the crown block sheaves, threaded back and forth through the traveling block sheaves and pulled down and attached to the drum 26 of draw-works. The wire line is now operative between two hoists and hook 9 may be raised and lowered by means of engines rotating the drums of the hoists. The usual method of stringing up a wire line depends on the weight to be handled, and the number of lines may be six, eight, or ten. The wire line used in my invention is made in the usual stranding and preforming machines, but in the first six hundred feet from end 23, instead of the hemp core I use an insulated electrical conductor for a core. The construction of this wire line is shown completely in my co-pending application 662,901, filed March 27, 1933, and is used in this line up to a point shown at BB in Figures 1 and 3. At this point the construction of the core is changed and a rubber tube 26 is used, with a small hole 27 in the center. The end of the rubber tube is slipped over contact 28, which is in turn soldered to the end of conductor 31 and vulcanized and molded around the conductor 29 and contact 28 to make a fluid-tight seal, as well as an insulated joint, where it joins the rubber 32 of the conductor. The length of the rubber tube 26 varies with the amount of resistance desired and the resistance medium used and the diameter of same, and may vary from a few inches to a hundred feet. The hole 27 is then filled with mercury 39 or other high-resistance material that is capable of elongation. Contact 36 is then placed in the tube in contact with the mercury 39 and soldered to cup contact 38 at 37, and the rubber vulcanized to the contacts so that the mercury is entirely sealed within the rubber. From the point 37 for the remainder of the cable above AA over the crown block and travelling block down to the drawworks drum, the regular hemp core 41 of the cable is used. The rubber core is covered with a fabric braid 33 impregnated and coated with a water-proof expansible compound 34 which is braided on the rubber 32 and 26 after the conductor 31, mercury column 39, and contacts 28 and 36 are made up. The steel strands are then applied over the wet fabric 33 in the manner described in my co-pending application No. 662,901, filed March 27, 1933. It is thus seen that I have provided an extensible resistance unit, thoroughly protected in the center of the wire line, and when any strain is placed on the wire line it elongates. This may amount to 15% elongation within the safe limit of the line. As the wire line elongates in proportion to the stress in the line or weight applied to it, so must the extensible resistance elongate. As the mercury elongates, its resistance increases in proportion to the elongation, and also increases due to the decrease in diameter. The electrical circuit within the cable is then through conductor 31, which must be very low in resistance as compared with the resistance of the mercury, through the contact 28, through the mercury 39, through contact 36, soldered at 37 into cup contact 38, which is in contact with the steel strands, and back through the steel strands 42. By providing a source of direct current of known potential at 43, connected in series through ammeter 46 to the conductor 31, through slip ring 47, and connecting the other direct current pole of the source to the steel strands through collector ring 44, the resistance may be measured. By keeping the potential constant as shown on voltmeter 48, all of the resistance in the circuit except the mercury column remains constant, so as the resistance of the mercury column changes due to elongation, so the current as shown by ammeter 46 will change in direct proportion to the change in resistance, which is changed in direct proportion to the elongation, which in turn is in proportion to the weight applied to the cable. After the device has been calibrated for zero reading, and several points on the scale determined by adding known weights to hook 9, the entire scale is worked out, then the dial of ammeter 46 may be made to read directly in pounds instead of amperes. In Figure 2, the steel strand 42 is connected to slip ring 44 by wire 49, and operating on the slip ring is brush 56 connected to the battery or direct current source, while the insulated end of conductor 31 is brought through bore 54 in the shaft at 53. Brush 55 contacts the slip ring 47 and is in turn connected to the source of energy 43 through the ammeter 46. The cable will be built so that in operation the resistance unit will come approximately between AA and BB, although the stress in the cable will be uniform from point 57 over the sheave, et cetera to point 58, and it can be used any place within this range. It will also be noted that the conductor could extend to both ends of the cable from the resistance unit in the middle and be made operative by the use of one collector ring on the shaft of each hoist, but this would be more expensive to manufacture.

While I have shown the preferred embodiment of my invention as applied to a drilling cable in an oil well, there are many other applications for this device. For example, a dynamometer for measuring the tension in high-voltage power lines may be made by using a piece of stranded line containing an extensible resistance unit between the dead end and a pulling clamp, and very accurate readings taken. Once my device is calibrated, it is very accurate and not subject to much variation due to temperature changes nor changes in friction. With the mercury column of very small diameter, it is possible to weigh very small increases in weight on a 1-inch or 1⅛-inch drilling line, after the initial stretch is removed. Furthermore, should excessive strains be applied, and a permanent stretch be placed in the line, it is only necessary to set to a new zero on the dial and recalibrate the scale. There are many other materials and compounds made up in liquids, pastes, or semi-solids, of high resistance, that can be used in place of mercury, depending upon conditions of use and compound of rubber or flexible dielectric used. This device may be made up in a short piece of stranded cable and placed between the bail 6 and clevis 7, but would require a connection so designed as to permit the raising and lowering of the travelling block.

I claim:—

1. In combination; a weight supporting cable composed of a plurality of wires; an extensible and variable resistance element within a chamber defined by said cable, and responsive to lineal variations of said cable; a conductor within said cable connected with said resistance element, and means for measuring variations in the resistance of said element.

2. In combination; multiple stranded weight supporting rope; a variable resistance means within said rope, said resistance means comprising a resilient envelope of insulating material and a relatively conductive fluid material therein; and means connecting said fluid material to a source of electrical energy.

3. In a multiple stranded weight supporting cable, an insulated conductor therein, an insulated fluid column resistance element within said stranded cable contractible and extensible therewith and electrically connected with said insulated conductor.

4. In a weight and tension measuring device; a multiple stranded weight supporting rope; an insulated variable resistance element disposed within a chamber in the rope, which chamber and contained resistance are subjected to lineal strains and responsive to elongation and contraction of the rope; a conductor means leading from said resistance element; and means connected with said conductor means for measuring variations in the resistance element in response to elongation and contraction of the rope.

5. In a weight and tension measuring device; a cable, comprising: an insulated conducting core occupying at least a portion of said cable, and a variable resistance element continuing from said core within a chamber providing a non-conducting wall in said cable which chamber and contained resistance are responsive to elongation and contraction of the cable; variable resistance measuring means; and circuit forming arrangement including said conducting core, resistance element, cable and measuring means.

6. The combination with a resistance measuring means; of a weight and tension determining cable comprising; a core; a multiple stranded weight supporting lay; an insulated elongated variable resistance element forming a portion of said core and varied in dimensions by elongation and contraction of the portion of the weight supporting lay therearound; and conductor means leading from said resistance element to said measuring means.

7. The combination with a resistance measuring means; of a weight and tension determining cable comprising: a core; a multiple stranded weight supporting lay; an insulated elongated variable resistance element forming a portion of said core and varied in dimensions by elongation and contraction of the portion of the weight supporting lay therearound; and a conductor means incorporating a portion of said core and a portion of said weight supporting lay and leading from said resistance element to said measuring means.

8. A weight or tension indicator comprising: a readily deformable element whose resistance is a function of its length; a yieldable weight supporting means surrounding said resistance element and providing a non-conducting wall therefor and connected with a load to elongate and contract in response to variations of said load and correspondingly influence said resistance element; and electrical means for measuring the resistance of said resistance element.

9. A weight or tension indicator comprising: an insulated variable resistance element having a resistance value which varies upon elongation and contraction; a yieldable weight supporting means surrounding said resistance element and connected with a load to elongate and contract in response to variations of said load and correspondingly influence said resistance element; conductors leading from said resistance element; a source of electrical energy to pass current through said resistance element; and measuring means arranged in a circuit with said resistance element to indicate variations in its resistance.

10. In a cable for weight and tension measuring purposes; the combination with a weight supporting lay capable of elongation and contraction, of a core comprising in part, a readily deformable insulated elongated variable resistance element within said weight supporting lay and partaking of the elongation and contraction thereof.

11. In a cable for weight and tension measuring purposes; the combination with a weight supporting lay capable of elongation and contraction; of a core comprising in part only of an insulated elongated variable resistance within said weight supporting lay and partaking of the elongation and contraction thereof, and an insulated conductor means leading from said resistance to an end of said cable.

12. A load sustaining cable formed with a hollow section having a non-conducting wall, said hollow section having a longitudinal dimension varying directly and a transverse section varying inversely with cable loads, a yieldable body filling said hollow section, said body having instantaneous resistance values proportional to its dimensions, and means for measuring said values.

WALTER T. WELLS.